(12) United States Patent
Tirio et al.

(10) Patent No.: US 8,714,258 B2
(45) Date of Patent: May 6, 2014

(54) PROCESS FOR TRANSPORTING FRACTURE ("FRAC") FLUID ADDITIVES TO OIL AND GAS WELLS UTILIZING ION EXCHANGE RESIN

(75) Inventors: Anthony P. Tirio, Pittsburgh, PA (US); Phil Fatula, Beaver Falls, PA (US); Michael Schelhaas, Cologne (DE)

(73) Assignees: Lanxess Sybron Chemicals Inc., Birmingham, NJ (US); LANXESS Deutschland GmbH, Cologne (DE)

( * ) Notice: Subject to any disclaimer, the term of this patent is extended or adjusted under 35 U.S.C. 154(b) by 172 days.

(21) Appl. No.: 13/309,926

(22) Filed: Dec. 2, 2011

(65) Prior Publication Data

US 2012/0160499 A1   Jun. 28, 2012

Related U.S. Application Data

(63) Continuation-in-part of application No. 12/859,897, filed on Aug. 20, 2010, now Pat. No. 8,087,462, which is a continuation of application No. 12/795,204, filed on Jun. 7, 2010, now abandoned.

(51) Int. Cl.
*E21B 43/26* (2006.01)

(52) U.S. Cl.
USPC .................. 166/308.2; 507/219; 507/922

(58) Field of Classification Search
None
See application file for complete search history.

(56) References Cited

U.S. PATENT DOCUMENTS

| | | |
|---|---|---|
| 4,199,680 A | 4/1980 | Moon |
| 4,419,245 A | 12/1983 | Barrett et al. |
| 4,427,794 A | 1/1984 | Lange et al. |
| 4,444,961 A | 4/1984 | Timm |
| 5,231,115 A | 7/1993 | Harris |
| 5,728,302 A | 3/1998 | Connor et al. |
| 6,221,287 B1 | 4/2001 | Podszun et al. |
| 7,841,411 B2 | 11/2010 | Fuller et al. |
| 2008/0119374 A1 | 5/2008 | Willberg et al. |
| 2012/0160499 A1 | 6/2012 | Tirio et al. |

FOREIGN PATENT DOCUMENTS

| | | |
|---|---|---|
| DE | 102006017371 A1 | 10/2007 |
| EP | 0046535 A2 | 3/1982 |
| WO | 9312167 | 6/1993 |

OTHER PUBLICATIONS

International Search Report dated Jul. 21, 2011 for PCT/US2011/039003 (2 pages).
Aften, Carl et al., "Critical Evaluation of Biocide-Friction Reducer Interactions used in Slickwater Fracs", SPE141358, SPE International Symposium on Oilfield Chemistry, Apr. 11-13, 2011.
Jordan, Andy, et al., "Quantitative Ranking Measures Oil Field Chemicals Environmental Impact", SPE135517, SPE Annual Technical Conference & Exhibition, Sep. 19-22, 2010.
Brannon, Harold D., et al., "Progression Toward Implementation of Environmentally Responsible Fracturing Processes", SPE147534, , SPE Annual Technical Conference & Exhibition, Oct. 3-Nov. 2, 2011.
Szymczak S., et al., "Long-Term Scale Inhibition using a Solid Scale Inhibitor in a Fracture Fluid", SPE102720, 2006 SPE Annual Technical Conference & Exhibition, Sep. 24-27, 2006.
Gupta D.V. Satya, et al., "Multi-Year Scale Inhibition from a Solid Inhibitor Applied during Stimulation", SPE115655, 2008 SPE Annual Technical Conference & Exhibition, Sep. 21-24, 2008.
European Search Report from co-pending Application EP 11792921.6, dated Jan. 21, 2014, four (4) pages.

*Primary Examiner* — Zakiya W Bates
(74) *Attorney, Agent, or Firm* — Nicanor A. Kohncke

(57) ABSTRACT

There is disclosed a process for transporting fracture fluid additives underground to oil and gas wells by attaching a fracture fluid additive to an ion exchange resin and flowing the ion exchange resin underground and thereafter releasing the frac fluid additives from the ion exchange resins and also there is provided the use of an ion exchange resin as a proppant and a frac fluid lubricant.

5 Claims, No Drawings

PROCESS FOR TRANSPORTING FRACTURE ("FRAC") FLUID ADDITIVES TO OIL AND GAS WELLS UTILIZING ION EXCHANGE RESIN

This application is a continuation-in-part of U.S. patent application Ser. No. 12/859,897, filed Aug. 20, 2010, , which is a continuation of U.S. patent application Ser. No. 12/795,204, filed Jun. 7, 2010, now abandoned, and all incorporated herein by reference.

The present invention relates generally to a process for transporting fracture fluid additives to oil and gas wells via ion exchange resin and also to the ion exchange resins carrying such fracture fluid additives.

BACKGROUND OF THE INVENTION

The extraction of natural gas from various shale formations has grown rapidly due to recent technology advances in horizontal drilling and hydraulic fracturing. Hydraulic fracturing overcomes the impermeability of shale relative to the release of natural gas trapped in the rock formation. Horizontal drilling allows greater gas collection from each well out of the relatively shallow but expansively wide shale formations. While these technologies have allowed extraction of natural gas from shale formations such as the Marcellus Shale formation in the eastern United States to be economically feasible, implementing these technologies is expensive.

Shale formations, such as the Marcellus Shale formation, may have a very tight structure that does not allow trapped natural gas to migrate through the formation easily. To facilitate gas movement, the shale formation must be fractured and fissures induced in the rock. To accomplish this, fluids, particularly water with a solid such as sand, are pumped at high pressure to crack the rock formation and wedge it open. The fluid used for hydraulic fracturing is known as "frac fluid." Additives may be used with the frac fluids. These so-called "frac fluid additives" may comprise a myriad of additive compounds of specific type and quantity necessary to meet, among others, the requirements of the shale formation, well depth and well characteristics. Frac fluid additives may comprise, and/or exclude, one or more of scale inhibitors, corrosion inhibitors, biocides, viscosity modifiers, lubricants, surfactants, oxygen scavengers, proppants, and other additive compounds appreciated by one skilled in the art. One notable type of frac fluid additive is a proppant additive, which is a solid, such as sand, that wedges the induced fissures open. Depending upon the geology of the area around the well, many of the frac fluid additives get diluted and washed away by the natural intrusion of underground water that can not be avoided. This water intrusion necessitates the continual addition of additional frac fluid additives that is costly and, in some cases, may be highly impractical.

BRIEF SUMMARY OF THE INVENTION

There is broadly contemplated, in accordance with at least one presently preferred embodiment of the present invention a process for depositing a frac fluid additive underground comprising: a) providing an ion exchange resin having at least one frac fluid additive operably attached thereto, b) depositing said ion exchange resin underground, and c) releasing/detaching said at least one frac fluid additive from the ion exchange resin.

In addition there is contemplated the use of an ion exchange resin that is a crosslinked, weakly basic, monodisperse, macroporous, anion exchange polystyrene resin functionalized with tertiary amine groups.

Furthermore, it is contemplated that the frac fluid additive attached to the ion exchange resin is a scale inhibitor. There is also provided the use of an ion exchange resin as a proppant per se and/or as a lubricity additive to a frac fluid.

In addition, there is also provided a process of using the above ion exchange resins comprising mixing the same with a frac fluid and flowing the mixture underground. Said mixing may occur aboveground or underground. As used herein underground shall include, inter alia, subterranea, such as underground shale formations, gas wells and oil wells.

For a better understanding of the present invention, together with other and further features and advantages thereof, reference is made to the following description, taken in conjunction with the accompanying Examples, and the scope of the invention will be pointed out in the appended claims.

DETAILED DESCRIPTION OF THE PREFERRED EMBODIMENTS

In accordance with at least one presently preferred embodiment of the present invention there is disclosed a process for attaching one or more frac fluid additives to an ion exchange resin. The tenacity of the attraction can be varied via the selective use of specific ion exchange resins and/or their modification via functionalization of the ion exchange resins. These so-formed modified ion exchange resins, having one or more frac fluid additives attached thereto, can be deposited underground into, for example, oil and/or gas wells. Thereafter, the frac fluid additives of the modified ion exchange resins can be subsequently released from the ion exchange, thereby allowing for their controlled dosing and use.

The principles of the exchange of ionized compounds via ion exchange resins is well known. Broadly stated, ion exchange is the exchange of ions between two or more ionized species located in different phases, at least one of which is an ion exchanger. Such ion exchange materials generally have fixed functional groups or sites capable of holding and exchanging various charged counter-ions. In a preferred embodiment, there is made use of crosslinked polymeric bead type ion exchange resin. The crosslinked bead type ion exchange resin may be either heterodispersed or monodisperse as is known to the skilled artisan. In the preferred embodiment use is made of monodisperse ion exchange resin. The process for preparing monodispersed bead ion exchange resin is also known such as, for example, fractionation, atomization, jetting, or by the seed-feed technique (reference is hereby made, for example, to U.S. Pat. No. 6,221,287).

The monodisperse bead polymers, the precursor of the ion exchange resin, can be produced, for example, by bringing to reaction monodisperse, if desired, encapsulated, monomer droplets consisting of a monovinylaromatic compound, a polyvinylaromatic compound, and an initiator or initiator mixture, and if appropriate a porogen in aqueous suspension. To obtain macroporous bead polymers for producing macroporous ion exchangers, the presence of porogen is utilized.

The various production processes of monodisperse bead polymers both by the jetting principle and by the seed-feed principle are known to those skilled in the art. At this point, reference may be made to U.S. Pat. No. 4,444,961, EP-A 0 046 535, U.S. Pat. No. 4,419,245 and WO 93/12167.

Monovinylaromatic unsaturated compounds used according to the invention are preferably compounds such as styrene, vinyltoluene, ethylstyrene, alpha-methylstyrene, chlorostyrene or chloromethylstyrene. Polyvinylaromatic compounds (crosslinkers) preferably used are divinyl-bearing aliphatic or aromatic compounds. Particularly preferably, use is made of divinylbenzene, divinyltoluene, trivinylbenzene, ethylene glycol dimethacrylate, trimethylol propane trimethacrylate, hexa-1,5-diene, octa-1,7-diene, 2,5-dimethyl-1,5-hexadiene and also divinyl ether. According to a preferred embodiment, the bead polymer is a monodisperse crosslinked polystyrene material.

In addition to the monodisperse gel-type ion exchangers, according to the invention, use may be made of monodisperse ion exchangers having a macroporous structure.

In addition to the use of aromatic monomers as the starting material for the polymeric ion exchange resin (for example, vinyl and vinylidene derivatives of benzene and of naphthalene (vinylnaphthalene, vinyltoluene, ethylstyrene, alpha-methyl-styrene, chlorostyrenes, and, preferably, styrene), various non-aromatic vinyl and vinylidene compounds may also be employed. For example, acrylic acid, methacrylic acid, $C_1$-$C_8$ alkyl acrylates, $C_1$-$C_8$ alkyl methacrylates, acrylonitrile, methacrylonitrile, acrylamide, methacrylamide, vinyl chloride, vinylidene chloride, and vinyl acetate.

The subsequent functionalization of the bead polymer ion exchange resin thereby provides a functionalized ion exchange resin is also generally known to those skilled in the art. For example, DE-A 10200601737, hereby incorporated by reference, describes a process for producing monodisperse macroporous basic ion exchangers having weakly basic, medium-basic or strongly basic groups by what is termed the phthalimide process, by a) reacting monomer droplets of at least one monovinylaromatic compound and at least one polyvinylaromatic compound and also a porogen and an initiator or an initiator combination to give a monodisperse crosslinked bead polymer, b) amidomethylating this monodisperse crosslinked bead polymer with phthalimide derivatives, c) reacting the amidomethylated bead polymer to give a basic ion exchanger having aminomethyl groups and d) reacting the basic ion exchanger by alkylation to give weakly basic to strongly basic anion exchangers having secondary and/or tertiary and/or quaternary amino groups.

In a preferred embodiment, preference is given to the use of a crosslinked, weakly basic, monodisperse, macroporous, anion exchange polystyrene resin being functionalized with tertiary amine groups, for example that which is commercially available from LANXESS Deutschland GmbH under the brand name LEWATIT® MP62.

To the ion exchange resins prepared according to the method as described above, there is preferably attached one or more frac fluid additives as mobile counterion of the functionalized ion exchange resin. Such frac fluid additives may comprise and/or exclude one or more of scale inhibitors, corrosion inhibitors, biocides, viscosity modifiers, lubricants, surfactants, oxygen scavengers, proppants, and other additive compounds. It being understood as discussed herein that the ion exchange resin of the invention may itself serve as proppant rather than carrying the same. Many frac fluid additives are positively or negatively charged and can be attached to conjugate anionic or cationic ion exchange resins. Scale inhibitors in accord with a preferred embodiment may include or exclude, without limit, chelating forms, crystal-formation interrupters, and others as are known to those skilled in the art. Scale inhibitors may be broadly characterized as either controlling the formation of mineral scale or disrupting the growth of scale crystals. The former category includes phosphonates, such as chelating phosphonates, including amino phosphonic esters, for example amino trimethylene phosphonic acid, organophosphonic carboxylic acids such as 2-phosphonobutane-1,2,4-tricarboxylic acid (PBTC) (e.g. Bayhibit® AM), hydroxyethanediphosphonic acid and other analog compounds based upon phosphonic acid, and higher molecular weight organic acids such as iminodisuccinic acid (e.g., Baypure® CX 100). The latter category includes scale inhibitors based on low molecular weight polymers that adhere to crystal structures and, thereby, limit crystal growth and/or weaken the crystal growth in scale formation. The most common polymers for this purpose are polyacrylates and polyaspartic acid (e.g., Baypure® DS).

Preference is hereby given, in one embodiment, to the attachment of various scale inhibitors. Thus, for example, in one embodiment there is attached the chelating agent iminodisuccinate via its salt form tetrasodium iminodisuccinate. The latter being commercially available from LANXESS under the brand name Baypure® CX 100. In another embodiment there is attached polyaspartate via its salt form sodium polyaspartate. The same being commercially available, for example, from LANXESS under the brandname Baypure® DS 100. In another embodiment there is attached PBTC. The same being commercially available in aqueous form, for example, from LANXESS under the brandname Bayhibit® AM.

As indicated above, the so-formed modified ion exchange resins, having one or more frac fluid additives attached thereto, can be deposited underground into, for example, oil and/or gas wells. Thereafter, the frac fluid additives of the modified ion exchange resins can be subsequently released from the ion exchange, thereby allowing for their controlled dosing and use. For example, where the polyaspartic acid scale inhibitor (BAYPURE® DS) is attached to the weakly basic ion exchange resin LEWATIT® MP62, the scale inhibitor (being an oligomer of an organic acid) can be dislodged from the ion exchange resin with a strong mineral acid, such as hydrochloric acid which is commonly used in frac fluid related operations. In this manner, release of the scale inhibitor can be controlled over time by the judicious addition of hydrochloric acid to adjust the pH of the frac fluid. Alternatively, the scale inhibitor may be released at a reduced rate by controlling the amount of acid added and/or the use of water instead of acid. Also, the scale inhibitor can be attached to a mixture of weakly basic and strongly basic ion exchange resins to affect a time release of the inhibitor.

Other benefits of combining frac fluid additives with the ion exchange resin can be realized due to the properties of the ion exchange resin prepared. The ion exchange resin, being a dense solid of considerable strength, additionally serves as a proppant per se whose size and size distribution can be selected by the manufacturing process of the resin. As such, the ion exchange resin may carry both particular frac fluids and also serve as a frac fluid proppant itself. Secondly, the use of ion exchange resin can reduce the amount of sand used in the frac fluid thereby reducing the abrasiveness of the frac fluid. Thirdly, the physical nature of the ion exchange resin, for example, as a dense sphere similar to a ball bearing shape may impart improved lubricity to the frac fluid.

Although the preferred embodiment of the present invention has been described herein with reference to the above discussion and below Examples, it is to be understood that the invention is not limited to that precise embodiment, and that various other changes and modifications may be affected therein by one skilled in the art without departing from the scope or spirit of the invention.

EXAMPLE

A chelating agent Lanxess BAYPURE® CX 100, was attached to a weakly basic ion exchange resin, in this case Lanxess LEWATIT® MP62. This was accomplished by adding 1000 mL of the resin to 816 grams of water in a glass Erlemeyer flask. To this was added 186 grams of Lanxess BAYPURE® CX 100 which is a solution of 34% iminodisuccinic acid sodium salt in water. The mixture was gently stirred and the solution pH adjusted to 6 with the addition of 15% (wt) hydrochloric acid. The mixture was continually stirred and kept at 60° C. and pH 6 for 24 hours. The modified resin was filtered from the reaction liquids and then rinsed with deionized water to make the final product.

What we claim:

1. A process comprising:
providing an ion exchange resin having at least one frac fluid additive being operably attached thereto,
depositing said ion exchange resin underground, and
detaching said at least one frac fluid additive attached to said ion exchange resin from the ion exchange resin,
wherein said frac fluid additive is 2-phosphonobutane-1,2,4-tricarboxylic acid.

2. The process according to claim 1, wherein said ion exchange resin is a crosslinked, weakly basic, monodisperse, macroporous, anion exchange polystyrene resin being functionalized with tertiary amine groups.

3. The process according to claim 1, wherein said depositing step comprises adding the ion exchange resin to a frac fluid aboveground and thereafter flowing said frac fluid underground.

4. The process according to claim 3 wherein said underground is subterranea.

5. A process for increasing the lubricity of a frac fluid, comprising:
providing an ion exchange resin having at least one frac fluid additive attached thereto, wherein said frac fluid additive is 2-phosphonobutane-1,2,4-tricarboxylic add, and
contacting said ion exchange resin with said frac fluid.

* * * * *